United States Patent
Lüde

(10) Patent No.: US 8,267,484 B2
(45) Date of Patent: Sep. 18, 2012

(54) QUICK-RELEASE AXLE

(75) Inventor: Dirk Lüde, Munich (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 253 days.

(21) Appl. No.: 12/527,297

(22) PCT Filed: Feb. 1, 2008

(86) PCT No.: PCT/EP2008/000798
§ 371 (c)(1),
(2), (4) Date: Aug. 14, 2009

(87) PCT Pub. No.: WO2008/101593
PCT Pub. Date: Aug. 28, 2008

(65) Prior Publication Data
US 2010/0096912 A1    Apr. 22, 2010

(30) Foreign Application Priority Data

Feb. 23, 2007    (DE) .................. 10 2007 009 405
Feb. 23, 2007    (DE) .................. 10 2007 009 406

(51) Int. Cl.
*B60B 27/00*    (2006.01)

(52) U.S. Cl. ........................ 301/124.2; 280/279
(58) Field of Classification Search .............. 301/124.1, 301/110.5; 280/279
See application file for complete search history.

(56) References Cited

U.S. PATENT DOCUMENTS

| | | | |
|---|---|---|---|
| 3,873,162 A | 3/1975 | Segawa | |
| 4,424,981 A * | 1/1984 | Maxwell, III | 301/110.5 |
| 4,906,053 A | 3/1990 | Kawai | |
| 5,284,383 A * | 2/1994 | Lehanneur | 301/110.5 |
| 5,823,555 A * | 10/1998 | Ashman | 301/124.2 |
| 6,089,675 A | 7/2000 | Schlanger | |
| 6,241,322 B1 | 6/2001 | Phillips | |
| 6,435,622 B1 | 8/2002 | Kanehisa et al. | |
| 7,530,645 B2 * | 5/2009 | Takachi | 301/124.2 |
| 7,537,291 B2 * | 5/2009 | Hara | 301/124.2 |
| 2007/0154286 A1 | 7/2007 | Spahr | |

FOREIGN PATENT DOCUMENTS

| | | |
|---|---|---|
| DE | 806201 | 3/1951 |
| DE | 19513764 | 10/1996 |
| DE | 60117331 | 11/2006 |
| EP | 1801005 | 6/2007 |
| FR | 957942 | 2/1950 |
| FR | 2218234 | 9/1974 |
| FR | 2680746 | 3/1993 |

* cited by examiner

*Primary Examiner* — Jason Bellinger
(74) *Attorney, Agent, or Firm* — Alan Kamrath; Kamrath IP Lawfirm, PA

(57) ABSTRACT

An axle arrangement (1) for two-wheelers, particularly for bicycles, includes a quick-release axle (2) having an axle (6) as the supporting part for a hub (7). The axle (6) can be inserted in receiving or dropout ends (3, 4) of a fork (5), a linkage, a rear end or similar mount. The axle (6) has a threaded end (16) and a quick-release fastener (9) with a tensioning lever (10) on the other end. One of the dropout ends (3, 4), or an intermediate supporting part that can be connected to the dropout ends (3, 4), has a screw-in thread (15) for screwing in the one threaded axle end (16) of the axle (6). In addition, an adjustable stop may be provided for the purpose of limiting the screw-in depth of the threaded axle end (16) in the screw-in thread (15) of the dropout ends or in the screw-in thread (15) of the intermediate supporting part connected to the dropout ends (3, 4).

17 Claims, 6 Drawing Sheets

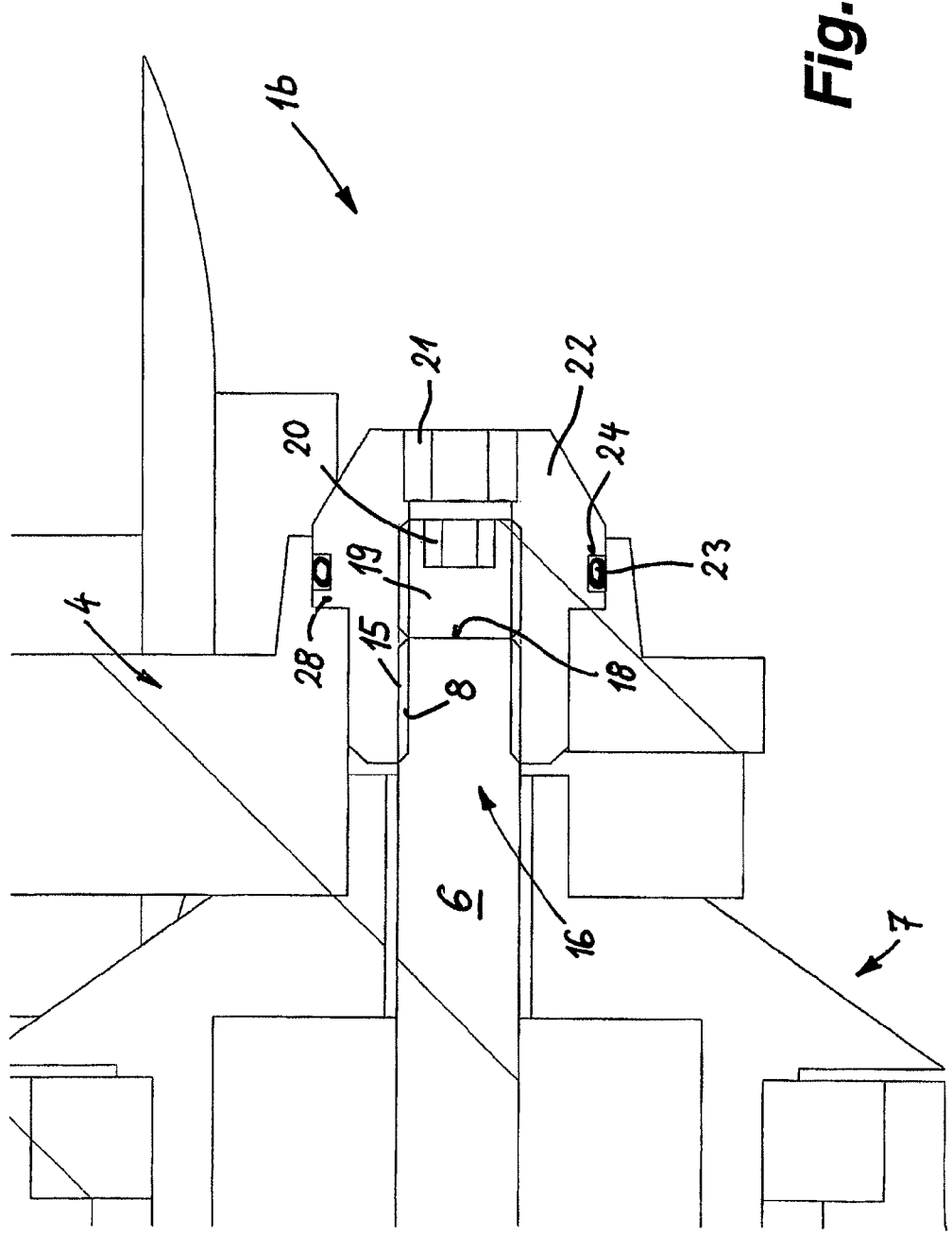

QUICK-RELEASE AXLE

BACKGROUND

The invention relates to an axle arrangement for two-wheelers, particularly for bicycles, wherein the axle arrangement comprises a quick-release axle with an axle as the supporting part for a hub, wherein this axle could be inserted into receiving ends of a fork, a linkage, a chain stay, or a similar mount, and wherein the axle has a threaded end and, on the other end, a quick-release fastener with a tensioning lever. The invention also relates to a tensioning mount with a quick-release fastener, an axle, and a locknut, wherein the axle has a threaded end and, on the other end, the quick-release fastener with a tensioning lever, particularly for an axle arrangement for two-wheelers, particularly for bicycles. Such tensioning mounts are known, for example, in quick-release axles but also in clamping fasteners, for example, for the seat pillar.

Quick-release axles have the advantage that they can be assembled and disassembled without a tool, wherein only the tensioning lever is to be activated.

However, for safety reasons, there are regulations for a fall-off safety device at least for front wheels, wherein this safety device prevents the front wheel from falling out of the fork when the quick-release fastener is open. In this way, however, the advantages of the quick-release axles are partially eliminated for the sake of safety.

In order to disassemble the front wheel, namely with one hand, the locknut of the quick-release fastener must be held tight, so that, with the other hand, the axle of the quick-release fastener on the lever could be screwed out somewhat further. As soon as the pressure piece located on the tensioning lever and forcing a dropout end outward and the locknut located on the other side have sufficient distance from the outside of the corresponding receiving end or dropout end that they come out of engagement from the fall-off safety device formed by depressions, allowing the axle and thus the wheel to be removed from the dropout ends.

For the assembly of the front wheel, the procedure must be performed in the reverse order. That is, after the insertion of the quick-release axle into the receiving ends, the locknut must be held tight with one hand, while, with the other hand on the tensioning lever, the axle must be screwed into the opposite locknut which is being held tight. For fixing the quick-release fastener lever, the correct screw-in position in the nut must also be set, so that the lever closes with the correct force. As a rule, the tensioning lever is moved into various screw-in positions and tested for whether sufficient tensioning force is provided. Through the manipulation with two hands, it is difficult to simultaneously hold the bicycle vertically so that the wheel sits in the correct position in the receiving ends of the fork.

SUMMARY

The object of the present invention is to provide an axle arrangement for two-wheelers of the type noted above in which the handling during disassembly and assembly of the quick-release axle or the wheel is simplified, and in this way, correct positioning of the axle arrangement and also secure connection to the fork, a linkage, a chain stay, or a similar mount are possible.

To meet this objective, it is provided that one of the receiving ends of the fork, the linkage, the chain stay, or a similar mount or an intermediate supporting part that can be connected to the receiving end has a screw-in thread for screwing in the threaded end of the axle.

In this way, for the assembly of the wheel after the insertion of the hub with the quick-release axle into the receiving ends of the fork, the linkage, the chain stay, or a similar mount, the screw-in end of the axle could be screwed into the screw-in thread, wherein this action can be performed with one hand, while the other hand is available for holding the two-wheeler in an appropriately oriented position. The correct positioning of the axle in the receiving ends of the fork is therefore significantly simplified.

Also, for disassembly, the quick-release fastener could advantageously be opened and screwed out with one hand. Simultaneously, one could hold the bicycle tight with the second hand.

So that the quick-release fastener with the axle passing through the hub is not lost during disassembly of the wheel, a sliding limiter is advantageously provided for the axle passing through the hub, advantageously a stop that is attached to the axle and that is located within the hub. For example, a slide index could be mounted on the axle, wherein this slide index is arranged so that the axle can move far enough from the hub that the screw-in end of the axle could be screwed out from the screw-in thread. In the stop position, the stop contacts the hub on the inside on the side facing the quick-release fastener. The stop is constructed so that the quick-release axle can rotate in the hub and can move in the axial direction in a certain range.

An especially advantageous improvement of the invention provides that an adjustable stop is provided for limiting the screw-in depth of the threaded axle end into the screw-in thread of the receiving end or into the screw-in thread of the intermediate supporting part connected to the dropout end. This makes a significant contribution to the fact that the mounting of the quick-release axle is reproducible with the fitting tensile stress and, in this way, a secure connection is created. The correct position for the quick-release fastener thus does not need to be found through testing and screwing the axle more or less into the screw-in thread, but instead the quick-release fastener is simply screwed up to the stop that has been set once, and the tensioning lever is then turned over for fixing the wheel.

The stop for limiting the screw-in depth of the threaded axle end into the screw-in thread is advantageously formed by a stop screw that advantageously can be screwed into the screw-in thread for screwing in the threaded axle end or into the axially connecting thread. When the axle of the quick-release fastener meets the stop screw, for example, a threaded pin that sits adjustably, for example, in the attachment thread of the fork or the like for the quick-release axle, then one cannot turn the quick-release fastener further, so that it is unambiguously indicated in which screw-in position, namely the stop position, the tensioning lever must be turned over, in order to establish the provided tensile stress.

For attaching the threaded axle end, instead of the screw-in thread, an intermediate supporting part with a screw-in thread for the threaded axle end could be provided directly in the receiving end of the fork, the linkage, the chain stay, or a similar mount. Here, the intermediate supporting part could be, in particular, a threaded bushing with internal and external threading or a stepped bushing with internal threading. The internal threading forms the screw-in thread for the threaded axle end, while the external threading or the step is used for connecting to the receiving end. Furthermore, an adapter part could be provided that is used for holding the threaded axle end or the intermediate supporting part and can be connected, on the other side, to the receiving end. The adapter part thus has connection means for connecting to an intermediate supporting part or a screw-in thread for the threaded axle end and also connection means for attaching to the receiving end of the fork, the linkage, the chain stay, or a similar mount. If the adapter part is provided directly with a screw-in thread for the threaded axle end, then, the adapter part simultaneously forms an intermediate supporting part.

For the use of such an adapter part, the receiving end could remain practically unchanged. The adapter part could be screwed, adhered, or attached in some other way on the outside onto the receiving end. The adapter part could also be a modified locknut with the ability to attach to the receiving end. The provided attachment and support of the threaded part on the outside on the receiving end is used for fixing the position and, thus, holds the adapter part in the provided position and secures it by rotating simultaneously during the screwing in of the threaded axle end or an intermediate supporting part.

An especially preferred configuration of the invention provides that the intermediate supporting part is configured as a simple locknut, wherein the locknut has a central screw-in thread for the threaded axle end and a stop screw can be screwed directly into the central screw-in thread. Advantageously, there are means for securing and/or making more difficult the rotational movement of the stop screw in the locknut. The stop position that has been set once therefore remains secure.

Together with a quick-release fastener and an axle, the locknut forms a tensioning mount that can also be used independent of an axle arrangement generally for clamping fasteners, for example, on a seat pillar.

As already mentioned, according to one variant, a threaded bushing that can be screwed into a receiving thread of the receiving end or the adapter part could be provided that has an outer attachment thread and internal threading as the screw-in thread for screwing in the threaded axle end. The threaded bushing could be dimensioned so that, on one hand, a sufficient screw-in depth is provided for the threaded axle end and, on the other hand, the stop for limiting the screw-in depth of the threaded axle end can be screwed in from the outside.

According to another variant, the adapter part could have a receiving thread for the threaded bushing with an outer attachment thread, wherein this threaded bushing has the screw-in thread for screwing the threaded axle end. In this embodiment, the threaded bushing is screwed into the adapter part, wherein, in turn, the threaded axle end and also a stop screw can be screwed into this threaded bushing.

In this embodiment, it is advantageous that the rotational position of the quick-release tensioning lever could also be set in this way. In its closed position, the quick-release tensioning lever should always point toward the rear or upward with reference to the direction of travel, so that this lever cannot become stuck on underbrush and then raise the risk that it is opened unintentionally during travel.

This adjustment ability is also given in the embodiment already mentioned above for the intermediate supporting part as a threaded bushing that can be screwed into a receiving thread of the receiving end and that has internal threading as a screw-in thread for screwing in the threaded axle end.

The attachment thread of the intermediate supporting part or the threaded bushing could be in the same sense and different in its pitch or in the opposite sense and optionally different in its pitch to the screw-in thread for the threaded axle end.

By rotating the threaded bushing, both the rotational position of the tensioning lever and also the tensioning force of the quick-release fastener can be set. For this purpose, the quick-release fastener could be turned when the threaded axle end is screwed into the threaded bushing until a fitting position is set with respect to the rotational position of the tensioning lever. Then, the threaded bushing could be turned until the axial position of the axle matches a provided tensioning force of the quick-release fastener. With a stop screw that can be screwed into the threaded bushing and that can be configured as a threaded pin, this screw-in depth of the threaded axle end is then fixed.

Thus, one can set independently from each other, on one hand, the rotational position of the tensioning lever in the tensioned position and, on the other hand, the tensioning force of the quick-release fastener. After this one-time setting, the set parts can be secured, so that the system can then be operated very easily with one hand.

One especially advantageous embodiment provides an intermediate supporting part that is constructed for a connection or hold with the receiving end or the adapter part, wherein this connection or hold has a positive-fit construction in the axial tensile direction of the axle and can rotate in the rotational direction. This intermediate supporting part also has at least one molded or recessed part. Advantageously, the intermediate support part is constructed as a stepped bushing that has a stop collar contacting the receiving end or the adapter part on the outside as a molded or recessed part and also the screw-in thread for the tensioning axle.

With an overall simplified construction, this embodiment also allows the rotational position of the tensioning lever and the tensioning force of the quick-release fastener to be set independently from each other.

In order to be able to set the rotational position of the tensioning lever, especially for a simple embodiment of the invention with the threaded axle end screwed directly into the receiving thread of the receiving end or the adapter part, the tensioning lever of the quick-release fastener could be connected to the axle so that it can rotate against a given holding moment.

BRIEF DESCRIPTION OF THE DRAWINGS

Additional configurations of the invention are listed in the additional subordinate claims. Below, the invention is explained even more closely with its essential details with reference to the drawings.

Shown are:

FIG. 6 is an enlarged detail view from FIG. 5 in the region of the screwed-in threaded axle end.

DETAILED DESCRIPTION OF THE PREFERRED EMBODIMENTS

Figure 1:
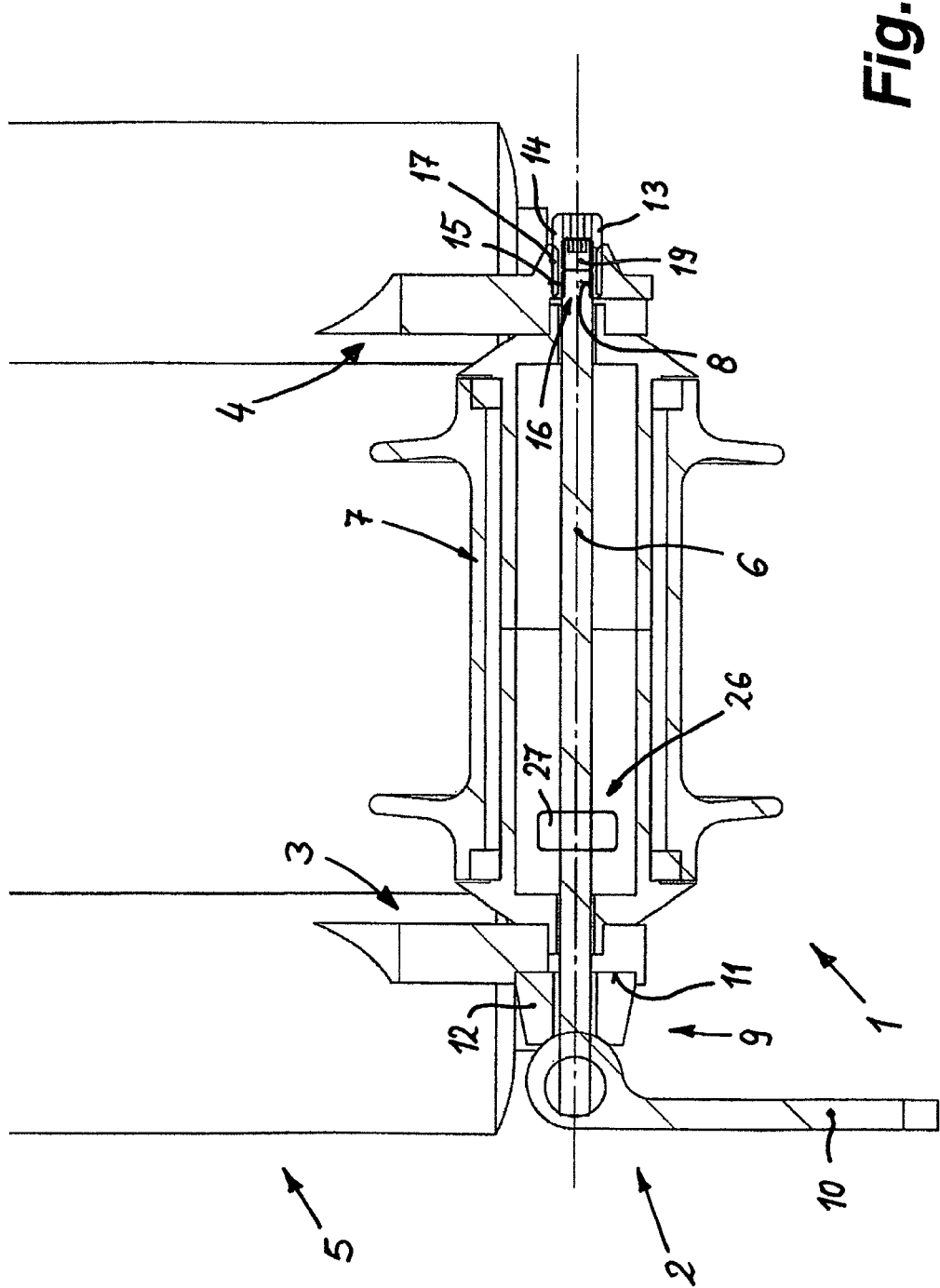
FIG. 1 is a cross-sectional view of an axle arrangement for two-wheelers with a quick-release axle inserted into the receiving ends or dropout ends of a fork with the threaded axle end screwed into a threaded bushing on one side.

An axle arrangement 1, 1a, 1b shown in the figures has a quick-release axle or tensioning mount 2 that is inserted into the dropout ends 3, 4 of a fork 5 of a two-wheeler, in particular, a bicycle. This axle arrangement could be inserted both into a fork 5 for a front wheel and also onto a linkage or on the chain stay for a rear wheel of a bicycle or a similar two-wheeler. In the embodiment, the axle arrangement 1, 1a, 1b is described in connection with the fork 5 for a front wheel. Typically, the receiving ends of a fork 5 for a front wheel are called dropout ends. The quick-release axle 2 has an axle 6 as a supporting part for a hub 7 that can rotate. On one end, the axle 6 has a thread 8 and, on the other end, a quick-release fastener 9 with a tensioning lever 10. The tensioning lever 10 is located in a tensioned position in the diagrams and can be pivoted for releasing the quick-release axle 2. On the dropout end 3, a fall-off safety device in the form of a depression 11 for a pressure piece 12 contacting there can be seen on the outside. Thus, even for an opened quick-release fastener 9, the axle 6 is prevented from falling out from this dropout end 3.

The other dropout end 4 is connected to the axle 6 by a screw connection. For this purpose, a threaded bushing 13 that has an attachment thread 14 on the outside and internal threading as the screw-in thread 15 for screwing in the threaded axle end 16 is provided in the embodiment according to FIGS. 1 and 2. With its outer attachment thread 14, the threaded bushing 13 is screwed into a receiving thread 17 provided in the dropout end 4. In detail, the connection region of the axle 6 with the dropout end 4 can be seen in an enlarged illustration in FIG. 2. A stop screw 19 contacting the end face 18 of the threaded axle end 16 is screwed into the screw-in thread 15 of the threaded bushing 13. This stop screw 19 and also the threaded bushing 13 each have a connection point for rotation. In the embodiment, hexagon sockets 20, 21 that are accessible from the outside are provided for fitting hexagon screw keys.

For the assembly of the wheel with the quick-release axle 2, the quick-release axle 2 is inserted with the hub 7 into the dropout ends 3, 4 of the fork 5, and the threaded axle end 16 is screwed into the threaded bushing 13. This takes place until the end face 18 of the threaded axle end 16 contacts the stop screw 19. This is adjusted so that, in the stop position of the axle 6, the desired tensioned position for the quick-release fastener 9 is given. Then, all that is necessary is to turn over the tensioning lever 10 into the tensioned position. The fitting tensioned position, thus, corresponds to a screw-in position from which a correct tensioning force is produced after the turning over of the quick-release tensioning lever 10.

The use of the threaded bushing 13 has the advantage that not only can the exact tensioned position be adjusted by the stop screw 19, but also the fitting rotational position of the axle 6 in which the tensioning lever 10 of the quick-release fastener 9 points toward the rear with respect to the direction of travel of the two-wheeler. For this purpose, the thread 8 of the axle 6 with the associated screw-in thread 15 in the threaded bushing 13 is advantageously constructed as a right-hand thread, while the receiving thread 17 in the dropout end 4 with associated attachment thread 14 of the threaded bushing 13 is formed as a left-hand thread. The adjustment of the correct tensioned position of the axle 6 and the fitting rotational position with the tensioning lever 10 pointing toward the rear can be performed in that the axle 6 is first screwed into the threaded bushing 13 that is screwed into the dropout end 4. This screwing-in process takes place up to a position that corresponds approximately to the fitting position close to the final position. Thus, wherein the stop screw 19 does not yet contact the end face 18 of the axle 6. In this screw-in position, the tensioning lever 10 can already be brought into the pro-vided rotational position. For setting the fitting tensioned position, if the tension when the tensioning lever 10 is turned over is not yet sufficient, the threaded bushing 13 is turned in the clockwise direction. Due to its left-hand thread, the threaded bushing 13 moves outward in the axial direction. Simultaneously, through the rotational movement of the threaded bushing 13, the axle 6 with its right-hand thread is screwed farther into the threaded bushing 13 and also moves accordingly in the axial direction outward in the direction of the arrow PF 1. This adjustment can take place until the correct tensioned position is reached. The threaded bushing 13 can be secured in this position, and the stop screw 19 is screwed up to the end face 18 of the axle 6. Thus, both the correct tensioned position of the axle 6 and also the correct rotational position of the tensioned lever 10 are fixed. The stop screw 19 can be fixed in this fitting position.

Figure 3:
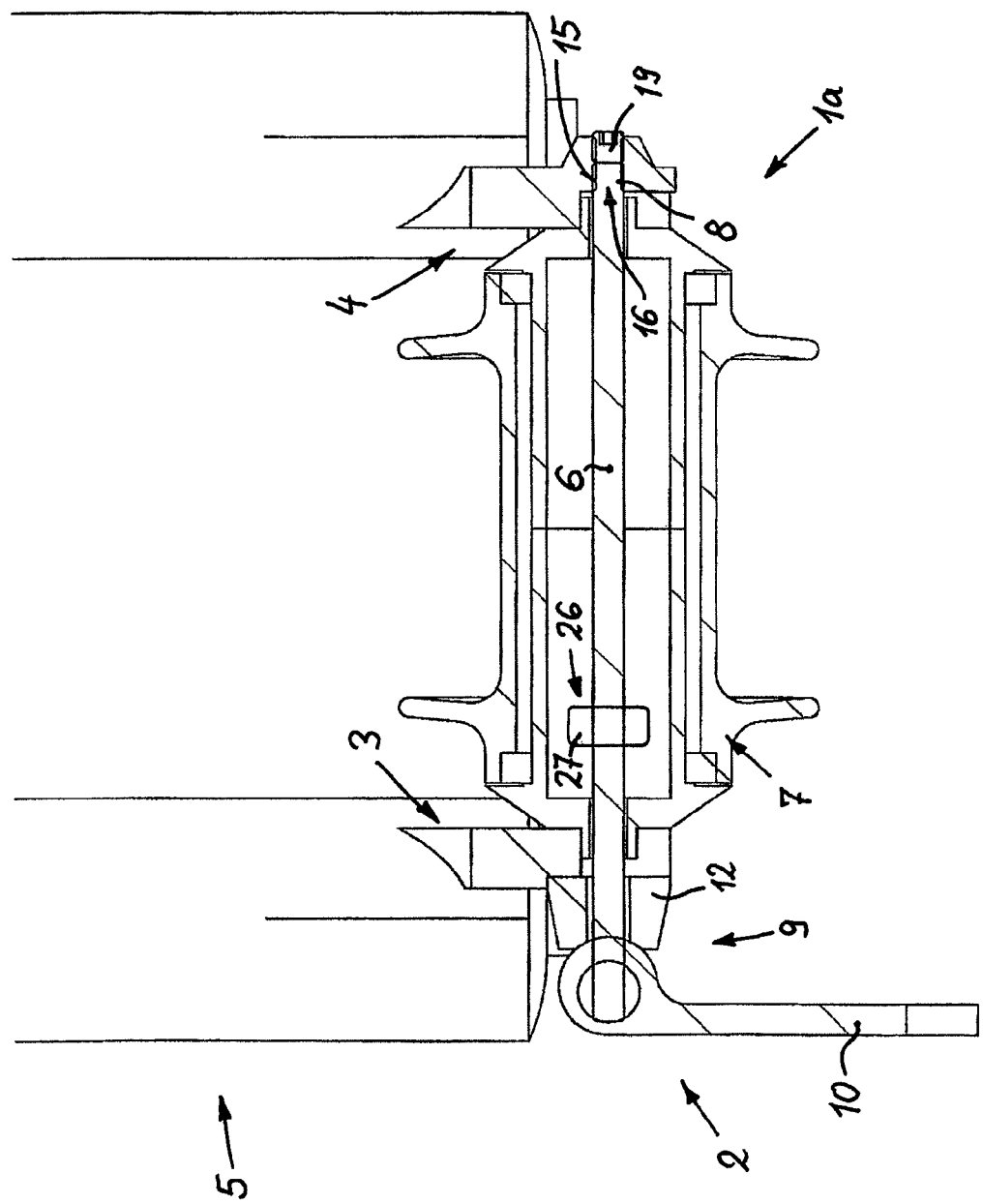
FIG. 3 is a view corresponding somewhat to FIG. 1, but with a threaded axle end screwed directly into a screw-in thread of a dropout end.
Figure 4:
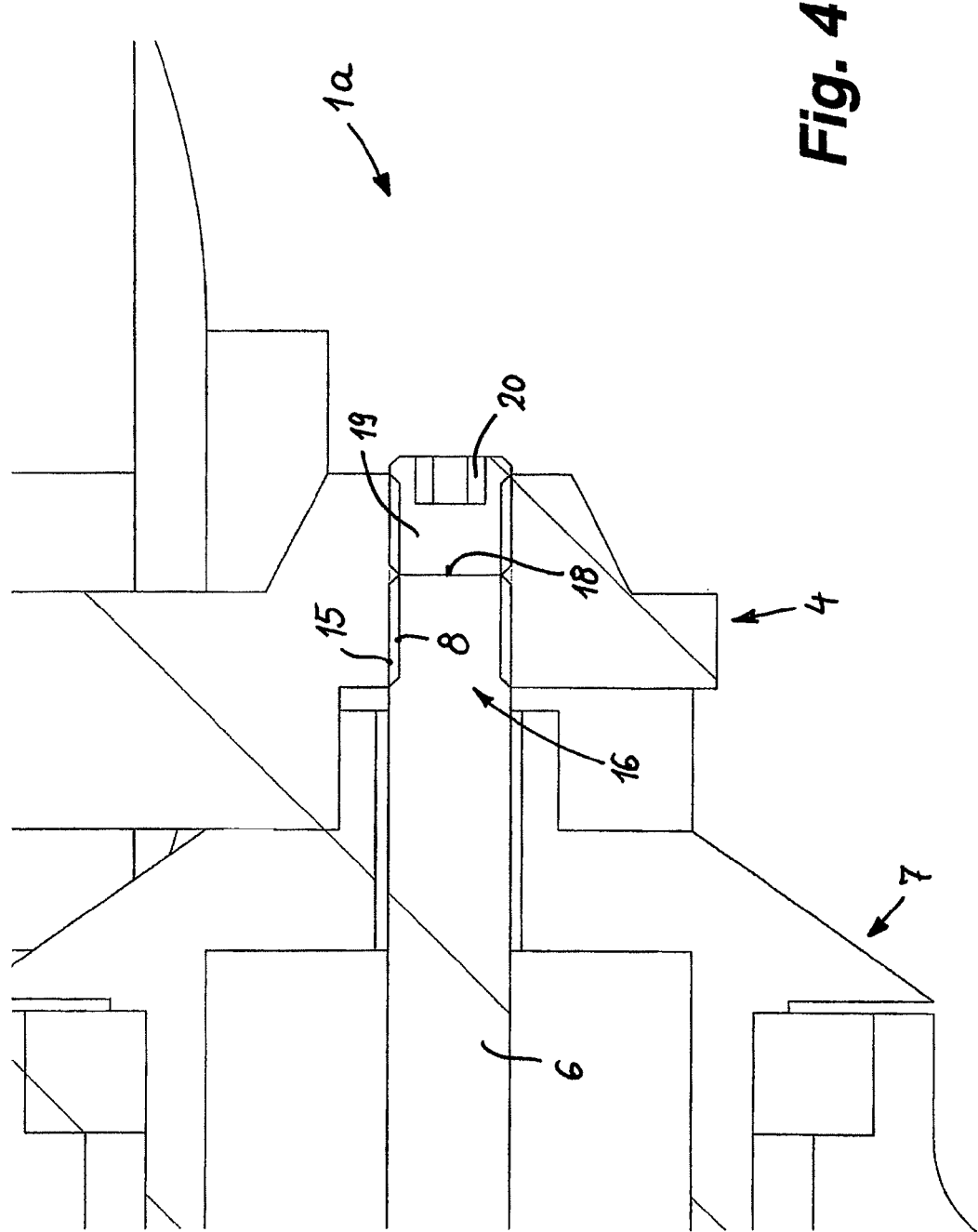
FIG. 4 is an enlarged detail view from FIG. 3 in the region of the screw-in end of the threaded axle end.

For the axle arrangement 1a according to FIGS. 3 and 4, the axle 6 is screwed with its threaded axle end 16 directly into a screw-in thread 15 of the dropout end 4. This simplified embodiment is provided especially when the tensioned position of the axle 6 is adjustable, but the rotational position of the axle 6 and thus, that of the tensioning lever 10, plays no role. The axle 6 is also screwed into the screw-in thread 15 of the dropout end 4 until the fitting tensioned position is reached. The stop screw 19 is turned in against the outer end face 18 of the axle 6, so that this fitting tensioned position is fixed.

Figure 2:
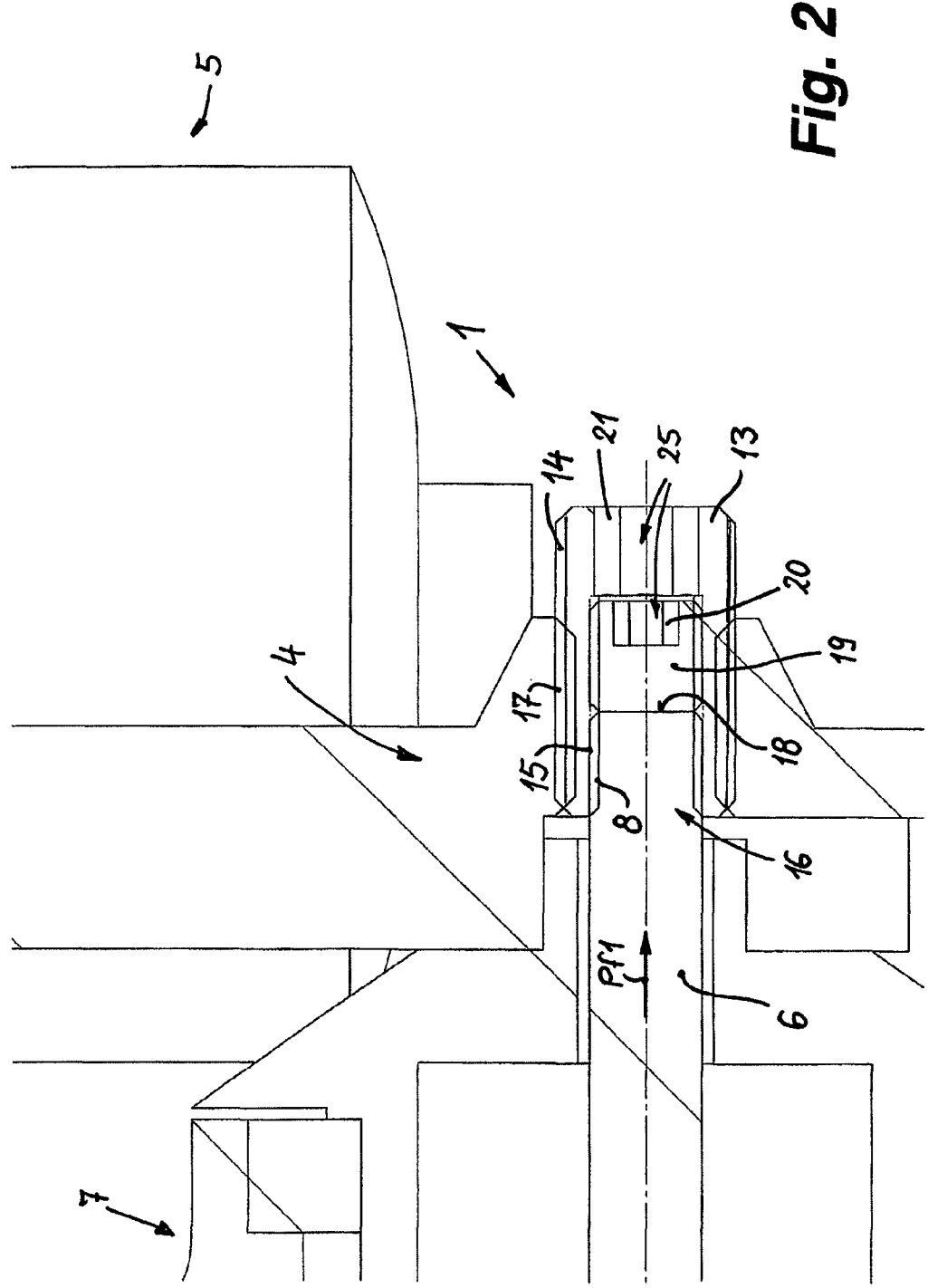
FIG. 2 is an enlarged detail view from FIG. 1 with illustration of the threaded axle end screwed into a threaded bushing.

For the embodiment of the axle arrangement 1 according to FIGS. 1 and 2, through the use of the threaded bushing 13, the rotational position of the quick-release fastener 9 can also be adjusted. It is advantageous that conventional quick-release axles 2 can be used.

However, for the simplified embodiment according to FIGS. 3 and 4, the rotational position of the quick-release axle 2 can also be adjusted if a quick-release fastener 9 modified according to the invention is used. This quick-release fastener 9 has a tensioning lever 10 that is connected to the axle 6 so that it can rotate against a given holding moment. Thus, the axle 6 can be screwed into the screw-in thread 15 up to the stop on the stop screw 19. After this screw-in position, where the axle 6 cannot be further rotated, the given holding moment between the quick-release mechanism and the quick-release axle 2 is overcome, so that the quick-release tensioning lever 10 can rotate into any arbitrary position, that is, also into the position pointing toward the rear, which is desired, as a rule. The tensioning lever 10 is, thus, in practice, connected to the axle 6 via a slip coupling.

Figure 5:
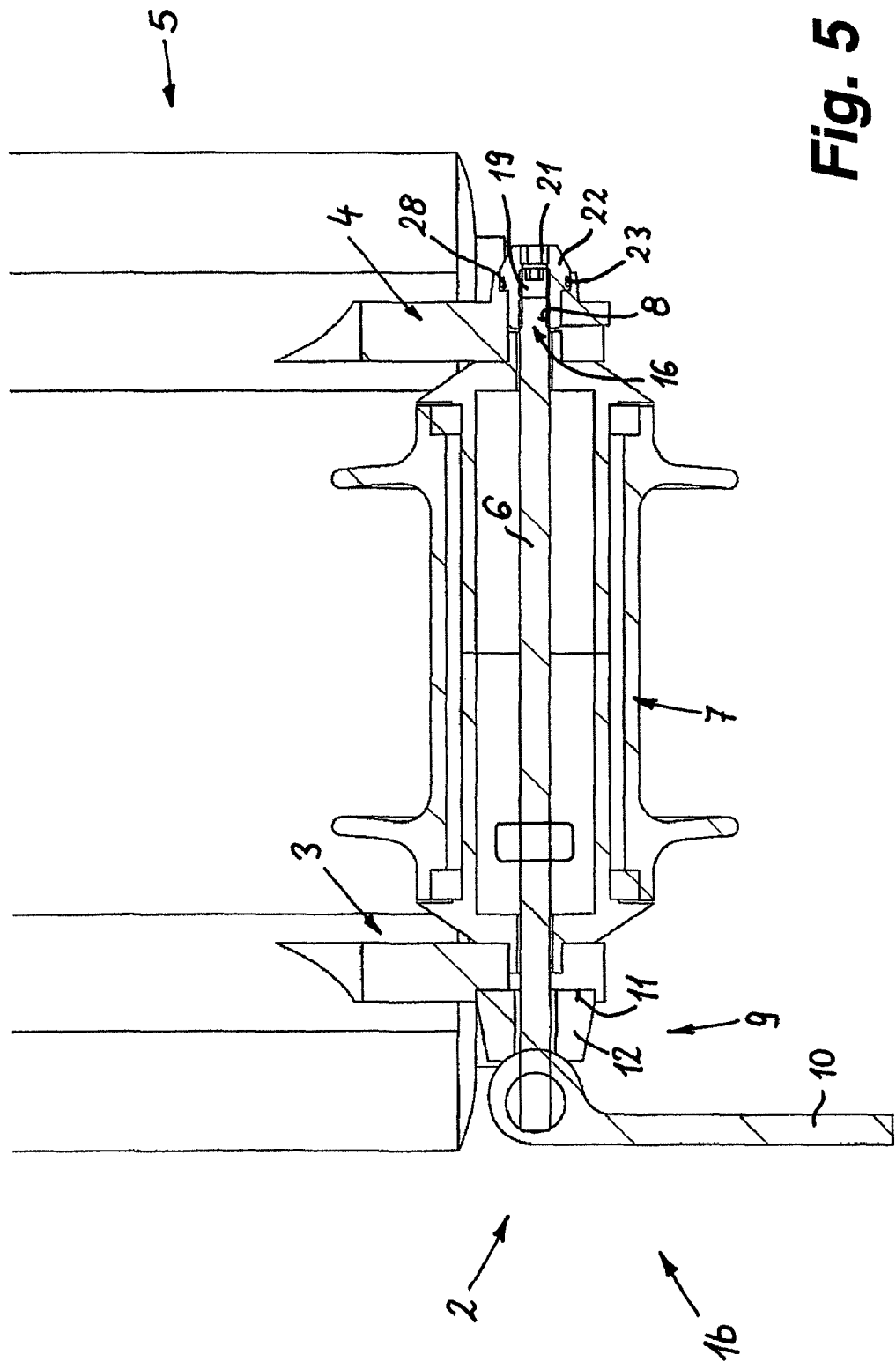
FIG. 5 is a view similar to FIG. 1, but with an intermediate supporting part for screwing in the threaded axle end.

FIGS. 5 and 6 show another embodiment of an axle arrangement 1b with a quick-release axle or a tensioning mount 2 in which a stepped bushing 22 or a locknut with a stop collar 28 is provided as the intermediate supporting part instead of a threaded bushing 13. This stepped bushing 22 is, therefore, inserted into the dropout end 4 with a positive-fit connection in the axial direction and can rotate in the rotational direction. The locknut has a stop collar 28 that is flat over its entire cross section and can be used in connection with a flat dropout end. Therefore, the invention can also be retrofitted for existing forks and quick-release axles. The stepped bushing 22 or the locknut has a screw-in thread 15 for the threaded axle end 16. The stop screw 19 can also be turned in the screw-in thread 15 from the outside. For this embodiment, both the adjustment of a tensioned position for a correct tensioning force and also the adjustment of the rotational position of the quick-release tensioning lever 10 are possible. It is especially advantageous that initially only the tensioned position can be adjusted completely independently from the correct rotational position and fixed by the stop screw 19. Then, at a later time, by rotating the stepped bushing 22, the axle 6 could be adjusted in the rotational direction until the tensioning lever 10 points in the correct position. The tensioned position remains unaffected. Advantageously, the rotational position is adjusted when the quick-release fastener 9 is open. An O-ring 23 is provided in a groove 24 of the stepped bushing 22 against unintentional rotation of the stepped bushing 22. This O-ring 23 is in friction-fit contact with the fixed dropout end 4. Comparable means for securing and/or making more difficult rotational movement could also be provided for the threaded bushing 13 and the stop screw 19.

In the three shown embodiments, the dropout end 4 is provided either with a screw-in thread 15 (FIGS. 3 and 4) or a receiving thread 17 (FIGS. 1 and 2) or special moldings can be formed around a stepped bushing 22. For retrofitting or for being able to leave the dropout end 4 unchanged, an adapter part not shown in the figures could be provided that could be connected to the dropout end 4 of the fork 5 and alternatively could have a connector element for connecting to an intermediate supporting part formed, for example, by a threaded bushing 13 or a stepped bushing 22 or the like or for connecting a screw-in thread for the threaded axle end 16 directly. The adapter part thus creates the connection between the different screw-in or attachment parts of the threaded axle end 16 and the unchanged dropout end 4 of the fork 5.

The threaded bushing 133 that can be screwed into the fork dropout end 4, in an adapter part or the adjustable stepped bushing 22, has a connection point 25 for rotation. In the embodiment, there are hexagon sockets that can be accessed from the outside for inserting a hexagon screw key.

It should be mentioned that if a threaded bushing 13 according to FIGS. 1 and 2 is used, then, with the requirement that the axle 6 has, as a rule, a right-hand thread, the threaded axle end 16 with associated screw-in thread 15 in the threaded bushing 13 are both right-hand threads, while the outer attachment thread 14 and the associated receiving thread 17 of the dropout end 4 are left-hand thread. There is also the possibility, however, that, even in the dropout end 4, the receiving thread 17 and the associated attachment thread 14 are in the same sense to that of the thread 8 of the axle 6, that is, have a right-hand thread. Then, however, different pitches must be provided, in order to create axial movement of the axle 6 when the threaded bushing 13 is rotated.

In FIGS. 1, 3, and 5, a sliding limiter 26 for the axle 6 can also be seen that can be formed by a stop, for example, a set collar 27, attached to the axle 6. This sliding limiter 26 is positioned so that the threaded axle end 16 could be pulled back somewhat up to the lateral hub limiter, but does not fall out as a whole from the hub. In the stop position, the sliding limiter 26 or its set collar 27 contacts the hub 7 on the inside.

The invention claimed is:

1. An axle arrangement for two-wheelers, comprising:
a quick-release axle with an axle inserted into receiving ends of a mount as a supporting part for a hub, wherein the axle has a threaded axle end and, on another end, a quick-release fastener with a tensioning lever, wherein one of the receiving ends includes a screw-in thread for screwing in the threaded axle end of the axle;
an intermediate supporting part connected to the one of the receiving ends; and
a threaded bushing screwed into a receiving thread of the one of the receiving ends, and wherein the threaded bushing has an outer attachment thread and an internal thread forming the screw-in thread for screwing in the threaded axle end, wherein the threaded bushing has a connection position for rotation, wherein the connection position is accessible and is formed by a hexagon socket for a hexagon screw key.

2. The axle arrangement according to claim 1, wherein the outer attachment thread of the threaded bushing has a same thread direction and different in pitch or an opposite thread direction to the screw-in thread for the threaded axle end.

3. The axle arrangement according to claim 1, further comprising a sliding limiter, attached to the axle and located within the hub, provided for the axle.

4. The axle arrangement according to claim 1, wherein the tensioning lever of the quick-release fastener is connected to the axle to rotate against a given holding moment.

5. The axle arrangement according to claim 1, wherein the quick-release axle is part of a front wheel and is inserted into the receiving ends of the mount in a form of a fork for the front wheel.

6. An axle arrangement for two-wheelers, comprising:
a quick-release axle with an axle inserted into receiving ends of a mount as a supporting part for a hub, wherein the axle has a threaded axle end and, on another end, a quick-release fastener with a tensioning lever, wherein one of the receiving ends includes a screw-in thread for screwing in the threaded axle end of the axle; and
an adjustable stop limiting a screw-in depth of the threaded axle end into the screw-in thread, wherein the adjustable stop is formed by a stop screw screwed into the screw-in thread for screwing in the threaded axle end or into a thread connecting in the axial direction.

7. The axle arrangement according to claim 6, further comprising an intermediate supporting part connected to the one of the receiving ends, wherein the intermediate support part has the screw-in thread for the threaded axle end.

8. The axle arrangement according to claim 6, further comprising a threaded bushing screwed into a receiving thread of the one of the receiving ends, and wherein the threaded bushing has an outer attachment thread and an internal thread forming the screw-in thread for screwing in the threaded axle end.

9. The axle arrangement according to claim 7, wherein the intermediate supporting part is constructed for connection or engagement with the one of the receiving ends with a positive-fit connection in an axial tensile direction of the axle and is rotatable in a rotational direction and has at least one molding or recess.

10. The axle arrangement according to claim 9, wherein the intermediate supporting part connected to the one of the receiving ends with the positive-fit connection in the axial tensile direction is constructed as a stepped bushing or locknut that has a stop collar contacting the one of the receiving ends.

11. The axle arrangement according to claim 9, further comprising means for securing the intermediate supporting part to the one of the receiving ends.

12. The axle arrangement according to claim 11, wherein the securing means comprises an O-ring, and wherein the O-ring is arranged in a groove of the intermediate supporting part.

13. The axle arrangement according to claim 8, wherein the threaded bushing has a connection position for rotation.

14. The axle arrangement according to claim 8, wherein the outer attachment thread of the threaded bushing has a same thread direction and different in pitch or an opposite thread direction to the screw-in thread for the threaded axle end.

15. The axle arrangement according to claim 6, further comprising a sliding limiter, attached to the axle and located within the hub, provided for the axle.

16. The axle arrangement according to claim 6, wherein the tensioning lever of the quick-release fastener is connected to the axle to rotate against a given holding moment.

17. The axle arrangement according to claim 6, wherein the quick-release axle is part of a front wheel and is inserted into the receiving ends of the mount in a form of a fork for the front wheel.

* * * * *